(12) United States Patent
Abramov et al.

(10) Patent No.: US 8,051,679 B2
(45) Date of Patent: Nov. 8, 2011

(54) LASER SEPARATION OF GLASS SHEETS

(75) Inventors: Anatoli Anatolyevich Abramov, Painted Post, NY (US); Marvin William Kemmerer, Montour Falls, NY (US); Yawei Sun, Horseheads, NY (US); Naiyue Zhou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 693 days.

(21) Appl. No.: 12/240,356

(22) Filed: Sep. 29, 2008

(65) Prior Publication Data

US 2010/0078417 A1    Apr. 1, 2010

(51) Int. Cl.
C03B 33/00 (2006.01)
C03B 33/02 (2006.01)
C03B 33/037 (2006.01)

(52) U.S. Cl. .............. 65/112; 65/29.18; 219/121.69

(58) Field of Classification Search ............ 219/121.68, 219/121.69, 121.84; 65/112, 29.18, 174; 83/76.1, 879–881
See application file for complete search history.

(56) References Cited

U.S. PATENT DOCUMENTS

| | | | |
|---|---|---|---|
| 3,839,005 A * | 10/1974 | Meyer | 65/112 |
| 4,467,168 A | 8/1984 | Morgan et al. | 219/121 |
| 4,468,534 A | 8/1984 | Boddicker | 219/121 |
| 5,084,604 A | 1/1992 | Dekker et al. | 219/121.72 |
| 5,138,131 A | 8/1992 | Nishikawa et al. | 219/121.67 |
| 5,609,284 A | 3/1997 | Kondratenko | 225/1 |
| 5,776,220 A | 7/1998 | Allaire et al. | 65/112 |
| 5,916,460 A | 6/1999 | Imoto et al. | 219/121.67 |
| 5,984,159 A | 11/1999 | Ostendarp et al. | 225/93.5 |
| 6,112,967 A | 9/2000 | Ostendarp et al. | 225/93.5 |
| 6,211,488 B1 | 4/2001 | Hoekstra et al. | 219/121.72 |
| 6,236,446 B1 | 5/2001 | Izumi et al. | 349/187 |
| 6,252,197 B1 | 6/2001 | Hoekstra et al. | 219/121.84 |
| 6,259,058 B1 | 7/2001 | Hoekstra | 219/121.75 |
| 6,300,593 B1 | 10/2001 | Powell | 219/121.68 |
| 6,327,875 B1 | 12/2001 | Allaire et al. | 65/103 |
| 6,407,360 B1 | 6/2002 | Choo et al. | 219/121.67 |
| 6,420,678 B1 | 7/2002 | Hoekstra | 219/121.75 |
| 6,512,196 B1 | 1/2003 | Yoon et al. | 219/121.67 |
| 6,541,730 B2 | 4/2003 | Nam et al. | 219/121.67 |
| 6,563,082 B2 | 5/2003 | Terada et al. | 219/121.72 |
| 6,590,181 B2 | 7/2003 | Choo et al. | 219/121.68 |
| 6,653,210 B2 | 11/2003 | Choo et al. | 438/460 |
| 6,713,720 B2 | 3/2004 | Jeon et al. | 219/121.72 |
| 6,723,952 B2 | 4/2004 | Choo et al. | 219/121.72 |
| 6,734,391 B2 | 5/2004 | Jeon | 219/121.72 |
| 6,744,009 B1 | 6/2004 | Xuan et al. | 219/121.67 |
| 6,770,842 B2 | 8/2004 | Nam et al. | 219/121.72 |

(Continued)

*Primary Examiner* — Samuel M Heinrich
(74) *Attorney, Agent, or Firm* — Kevin M. Able

(57) ABSTRACT

Methods of using a laser to separate a glass sheet is presented that employs an elongated and, preferably, asymmetrically-truncated laser beam. The methods allow glass sheets suitable for use in modern display applications to be separated at speeds up to about 200 mm/s with low levels of residual stress, e.g., levels of residual stress which are less than or equal to 100 psi, and preferably less than 50 psi. Glasses with high coefficients of thermal expansion (e.g. greater than about $35\times10^{-7}/°$ C.) may be separated at faster speeds. Such low levels of residual stress translate into low levels of distortion during the manufacture of display panels (e.g., LCD panels) as well as in improved properties (geometry, strength, defect-free etc.) of the separated edges. The methods can be used with glasses of various types including glasses having high coefficients of thermal expansion and also with glass sheets of different thickness.

10 Claims, 2 Drawing Sheets

U.S. PATENT DOCUMENTS

| | | | |
|---|---|---|---|
| 6,787,732 B1 | 9/2004 | Xuan et al. | 219/121.67 |
| 6,800,831 B1 | 10/2004 | Hoetzel | 219/121.72 |
| 6,870,129 B2 | 3/2005 | Hauer et al. | 219/121.72 |
| 6,894,249 B1 | 5/2005 | Hauer et al. | 219/121.72 |
| 8,011,207 B2 * | 9/2011 | Abramov et al. | 65/112 |
| 2002/0046997 A1 | 4/2002 | Nam et al. | 219/121.72 |
| 2002/0060210 A1 | 5/2002 | Terada et al. | 219/121.76 |
| 2002/0170896 A1 | 11/2002 | Choo et al. | 219/121.72 |
| 2002/0195434 A1 | 12/2002 | Nam et al. | 219/121.72 |
| 2003/0062348 A1 | 4/2003 | Jeon et al. | 219/121.72 |
| 2003/0146197 A1 | 8/2003 | Jeon | 219/121.72 |
| 2003/0209528 A1 | 11/2003 | Choo et al. | 219/121.72 |
| 2004/0020960 A1 | 2/2004 | Hauer et al. | 225/2 |
| 2004/0056008 A1 | 3/2004 | Choo et al. | 219/121.69 |
| 2004/0232116 A1 | 11/2004 | Yamazaki et al. | 219/121.8 |
| 2004/0232124 A1 | 11/2004 | Nagai et al. | 219/121.72 |
| 2004/0251290 A1 | 12/2004 | Kondratenko | 225/2 |
| 2004/0262273 A1 | 12/2004 | Nam et al. | 219/121.67 |
| 2005/0029239 A1 | 2/2005 | Matsumoto et al. | 219/121.72 |
| 2006/0011593 A1 | 1/2006 | Fukuyo et al. | 219/121.67 |
| 2006/0021978 A1 | 2/2006 | Alexeev et al. | 219/121.72 |
| 2006/0148213 A1 | 7/2006 | Iwamura et al. | 438/463 |
| 2006/0151450 A1 | 7/2006 | You et al. | 219/121.67 |
| 2006/0209224 A1 | 9/2006 | Nakanishi | 349/56 |
| 2007/0062921 A1 | 3/2007 | Karube et al. | 219/121.72 |
| 2007/0151962 A1 | 7/2007 | Doll et al. | 219/121.72 |
| 2007/0158317 A1 | 7/2007 | Brix et al. | 219/121.72 |
| 2007/0170161 A1 | 7/2007 | Yoo et al. | 219/121.72 |
| 2007/0241085 A1 | 10/2007 | Hiroya et al. | 219/121.72 |

* cited by examiner

LASER SEPARATION OF GLASS SHEETS

FIELD OF THE INVENTION

This invention relates to laser separation of glass sheets, such as the glass sheets used as substrates in the production of display devices, e.g., thin film transistor liquid crystal displays (TFT-LCDs), and more particularly to full body separation of a glass sheet in a single step (i.e. without the need for pre-separation scoring).

BACKGROUND OF THE INVENTION

Cutting of glass is conventionally accomplished by using mechanical tools. Typically, the glass is first scored, such as by using a scoring tool (e.g. a sharp carbide wheel for example) that creates a score, or median crack, in the glass, and incidentally, substantial damage to the glass at the cut edge. However, alternative processes exist that use $CO_2$ laser radiation at a wavelength of 10.6 μm to heat the glass and create tensile stress via a temperature gradient to produce a score, a less damaging process. During laser scoring, a small initial flaw is formed on a surface of the glass near one of its edges to generate a median crack (also known as a partial vent or, simply, a vent). The vent is then propagated by a laser light formed into a beam that traverses across the surface of the glass followed by a cooling area produced by a cooling nozzle. Heating of the glass with a laser beam and quenching it immediately thereafter with a coolant creates a thermal gradient and a corresponding stress field that is responsible for the propagation of the vent. When the score is completed, bending or shear stress is then applied to the glass that causes the vent to complete its propagation through the thickness of the sheet. In either case, however, separation of the glass sheet is a two step process consisting of creating a score, and then applying a stress to the glass (e.g. a bending stress) to propagate the vent and separate the sheet, sometimes referred to as "score and snap". In some processes, a second laser beam may be used to apply thermal stress to the glass that completes the separation process.

A problem with conventional techniques for separating sheets of glass using a laser relates to the coefficient of thermal expansion (CTE) of the glass as it is initially scored. Conventional laser scoring techniques have used glasses with relatively high CTE'S, e.g., Corning Incorporated's Code 1737 LCD glass which has a CTE (0-300° C.) above 37× $10^{-7}$/° C. More recent glasses, e.g., Corning's EAGLE$^{2000}$® and EAGLE XG™ glasses, have lower CTE'S. Higher CTE'S, such as that of Code 1737 glass, translate into higher tensile stresses during heating which, all other things being equal, means that it is easier to laser score such glasses at higher speeds. The lower CTE's of the more modern glass substrates used by the LCD industry result in much lower scoring speeds when conventional laser scoring technology is used, further prolonging such two step methods. Finally, the two step process can be challenging to achieve good edge quality.

It would be beneficial to provide a single step process for separating glass sheets that can provide a clean edge (minimal damage to the glass) with minimal residual stress with a faster cycle time.

SUMMARY OF THE INVENTION

In accordance with an embodiment of the present invention, a method of separating a glass sheet is disclosed comprising a) translating a single elongated laser beam having a peak intensity $I_{peak}$ over a surface of the glass sheet at a speed S, said beam being characterized by an untruncated length $L_0$, where $L_0$ equals the maximum distance along the length of the beam between locations at which the beam intensity at the surface of the glass sheet, in the absence of any truncation, has fallen to $1/e^2$ of $I_{peak}$; (b) translating a coolant area over the surface of the glass sheet in tandem with the laser beam, thereby separating the glass sheet into sub-pieces; wherein: (i) S is less than about 200 millimeters/second; (ii) $L_0$ is greater than or equal to 100 millimeters; and (iii) $I_{peak}$ and $L_0$ are selected such that translation of the laser beam over the surface of the glass sheet at speed S produces a maximum temperature at the surface of the glass sheet that is at least about 150° C. less than a strain point of the glass; and wherein the glass sheet is separated in a single traverse of the laser beam.

The reference numbers and symbols used in the above summaries of the various aspects of the invention are only for the convenience of the reader and should not be interpreted as limiting the scope of the invention. More generally, it is to be understood that both the foregoing general description and the following detailed description are merely exemplary of the invention and are intended to provide an overview or framework for understanding the nature and character of the invention.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification. It is to be understood that the various features of the invention disclosed in this specification and in the drawings can be used in any and all combinations.

DETAILED DESCRIPTION

Figure 1:
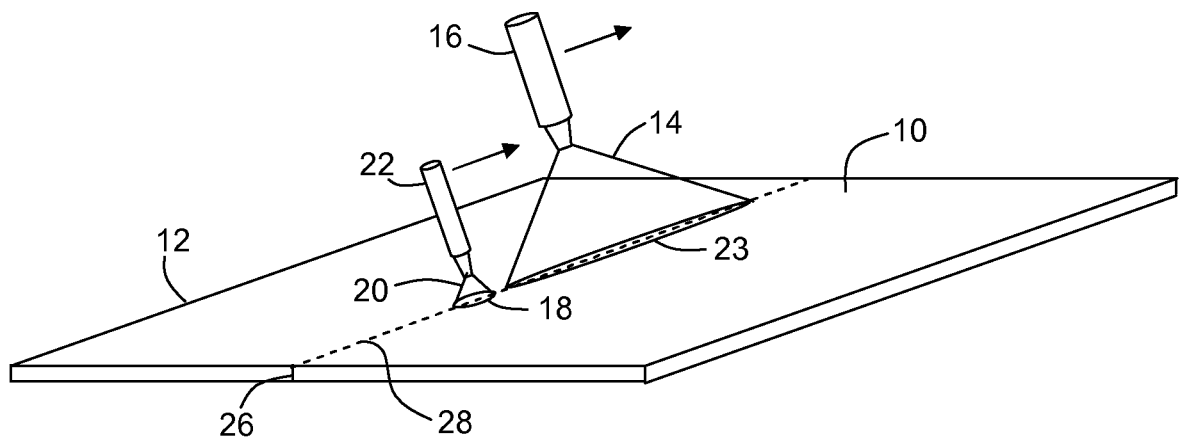
FIG. 1 is a perspective view of a system for laser separation of a glass sheet according to an embodiment of the present invention.

Laser scoring and separation as conventionally practiced typically employs a carbon dioxide laser operating at a wavelength of 10.6 μm. At this wavelength the absorption of oxide glasses can exceed $10^5$-$10^6$ m$^{-1}$, which makes the effective penetration depth of $CO_2$ radiation less than 1-10 μm. Thus, formation of a full body vent (a crack extending through the entire thickness of the glass sheet) during a single step laser separation process employing a $CO_2$ laser mainly relies on thermal conductivity of the heat below the glass surface, which is a relatively slow process. Therefore, high surface absorption and thermal conductivity of the glass are two fundamental factors that determine the process window and limit the separation speed.

To reach the required tensile stress to form a vent, the power density of the laser beam should be high enough to provide the needed temperature differential at the surface of the glass. However, if the power density is too high, the energy delivered to each point on the glass surface along the separation line during the exposure can cause ablation or evaporation of the glass. Such high power densities can also result in high levels of residual stress both at the edge of a separated sub-piece and within the area of glass adjacent to it. On the other hand, if the exposure time is short (when the separation speed is high), the energy delivered to the glass may be insufficient to heat the glass below the surface and create a vent that extends through the entire thickness of the sheet (full body separation).

In accordance with embodiments of the present invention, the above challenges are addressed using a solution that completely separates glass sheets (full body separation), at relatively high speeds, with low levels of residual stress, including glass sheets composed of glasses having low coefficients of thermal expansion. That solution involves the use of a single elongated beam with an untruncated length $L_0$ greater than or equal to 200 millimeters. Because of its long length, the beams used in the practice of the invention generally have large ratios of their major to minor axes, e.g., ratios greater than 130, preferably greater than 200, and most preferably greater than 300.

A beam of this type results in a prolonged residence time on the surface of the glass during separating of the glass that enables the creation of a vent that extends completely through the thickness of the sheet at scoring speeds up to about 200 mm/s for a 0.7 mm thick sheet of display-type glass. Moreover, the beam configuration and power distribution of the laser mode can be chosen to keep power density at a relatively low level enabling a consistent separation process without overheating of the glass surface above the strain point of the glass being separated. In particular, for display-type glasses (e.g. glass having a coefficient of thermal expansion between about $30 \times 10^{-7}/°$ C. and $35 \times 10^{-7}/°$ C.) the glass should not exceed a temperature more than about 150-200° C. below the strain point of the glass. This represents a clear advantage of the method since it means that relatively high separation speeds can be used without the generation of high levels of residual stress, and further, without the need for secondary process steps, as would be needed if mere scoring of the glass was generated. In addition, it has been found that the tensile stress generated during the separation can be maximized by adjusting the relative position of the cooling zone and the trailing edge of the beam. This allows the temperature differential along the surface of the glass to be increased while holding the maximum temperature at the surface of the glass well below the strain point of the glass. It should be noted that glass sheets having thicknesses less than 0.7 mm can be separated much faster, e.g. speeds exceeding about 200 mm/s, and even exceeding about 500 mm/s.

In accordance with certain embodiments, full body laser separation is performed using a non-symmetrical laser beam, e.g., a beam that has been truncated on just one end. Preferably, the beam has a size (length) and power density that can be varied to accommodate different glass types and/or processing conditions (e.g., laser beam traverse speeds), although beams having a fixed size and power density can be used in the practice of the invention if desired, e.g., in connection with a dedicated sheet separating station used for a single type and thickness of glass.

To create and propagate a laser vent at a given speed, each point on the glass surface should experience the same thermal history determined by the following parameters: laser power and distribution of the power density within the laser beam; heating speed; maximum glass surface temperature achieved during heating; and quenching efficiency and location of the quenching zone. In general terms, the separation methods of the present invention balance the system's process parameters such that a variation of one parameter is compensated by a variation of one or more other parameters so as to maintain essentially the same desirable thermal history for each point on the glass surface along the separation line.

For any given type of glass and separation speed, the invention achieves relatively high speed, full body separation with low residual stress by meeting the following conditions:

(1) the transient thermal stress created by heating and subsequent cooling of each point of the separation line exceeds the breaking stress of the glass, allowing stable propagation of the vent along the separation line once it originates from an existing flaw;

(2) the exposure of each point on the glass surface along the separation line to laser radiation is sufficient to create a vent that extends through the entire thickness of the glass sheet. However, the duration of the exposure and the power density of the laser beam are selected so as not to cause overheating of the glass surface, thus allowing the process to be run without inducing substantial amounts of residual stress. Indeed, the process has been shown to operate well wherein the temperature at any point in the glass during the heating does not exceed about 510° C. and is preferably between about 460° C. and 510° C. (in particular case of separation of EAGLE$^{2000}$® and EAGLE XG™ glasses); and (3) the location of the quenching zone at the trailing edge of the beam is chosen to maximize the thermal stress gradient for a given maximum glass surface temperature.

The application of these principles can be best understood by considering FIG. 1. As illustrated in FIG. 1, the laser separation processes includes heating a surface 10 of glass sheet 12 with a beam 14 from laser 16 followed by a quenching zone or cooling area 18 produced by a coolant 20 emitted from nozzle 22. The footprint 23 of beam 14 on surface 10 is of a limited size. During the laser separation process, a median crack (or vent) 26 is created along separation line 28 that is propagated through the full thickness of the glass sheet. As discussed above, to create the vent, a small initial flaw is first formed on the glass surface, which is then transformed into the vent and propagated by the laser beam and the quenching zone to extend through the complete thickness of the glass sheet. The cooling area is positioned at some distance outside the beam boundaries.

Separation of the glass sheet can be described in terms of the tensile stress σ produced in the glass during the separation process. This tensile stress is proportional to $\alpha^* E^* \Delta T$, where α is the glass' linear thermal expansion coefficient (CTE), E is the glass' modulus of elasticity, and $\Delta T$ is a measure of the temperature difference on the surface of the glass between the portion of the surface located under the laser beam and the portion located under the cooling nozzle.

To produce a vent, the generated tensile stress must be higher than the molecular bonds of the glass. The lower the CTE and modulus of elasticity of the glass, the lower the generated tensile stress and, consequently, the lower the traverse speed of the laser and cooling area for a given set of conditions. For a given $\alpha^* E$ product, tensile stress σ can be increased by heating the glass to a higher temperature. However, overheating of the glass close to or above its strain point causes glass ablation and entails the formation of irreversible high residual stress in the glass, which deteriorates the quality of the edge of a sub-piece, reduces its strength and makes for inconsistent operation of the separation process.

Figure 2:
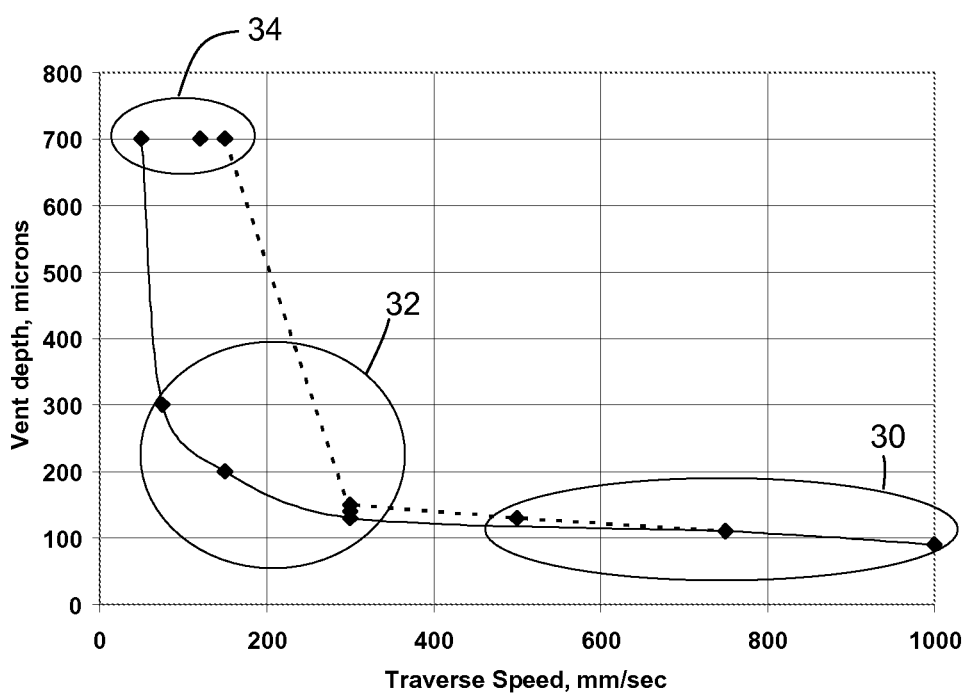
FIG. 2 is a graph of vent depth versus laser traverse speed for a variety of different speeds, and shows a sharp increase in vent depth below a particular threshold speed for a given set of conditions.

To address these problems, studies were undertaken in which vent depth as a function of laser traverse speed for a glass sheet having a nominal thickness of 0.7 mm was measured. The data, shown in FIG. 2, demonstrate that complete separation of the sheet can be obtained by slowing the traverse speeds to a point much lower than what is customarily used in a conventional laser scoring process. It has been assumed in conventional processes that vent depth was a linear function of traverse speed, S. However, vent depth has been found by the present inventors to be a non-linear function of the traverse speed, namely that in general the vent depth is inversely proportional to the laser beam traverse speed and also depends on beam residence time. The latter is defined by beam traverse speed and by the length of the beam. That is, as is clear from FIG. 2, all other things remaining constant, a decrease in traverse speed (increase of beam residence time) obtains a dramatic increase in vent depth below some lower threshold. As indicated in FIG. 2, regions 30 and 32 represent prior art regimes for laser scoring of glass sheets, with region 30 representing early methods having vent depths on the order of about 100 μm, and region 32 representing deeper vent depths on the order of about 125 μm to about 300 μm. For display-type glasses, this threshold is approximately about 200 mm/s, and as indicated by region 34, vent depths of 700 μm can be obtained using method of the present invention— the entire thickness of a 0.7 mm sheet of glass typical for a display application. Concurrently, a decrease in traverse speed allows for a reduction in laser power, further protecting the glass from damage (e.g. burning) by the laser. Accordingly, power densities at the surface of the glass using methods of the present invention can be reduced, for example, to as low as about 0.7-1.5 W/mm² compared to the 2-7 W/mm² typically found in conventional laser scoring processes. It has also been found that in the separating regime (i.e. region 34), the separating process is significantly more sensitive to process variations, such as, for example, small changes in internal local stress within the sheet that can result from the deployment conditions of the sheet. That is, handling, supporting, tensioning and vibrations induced into the glass during the separating process. It is believe this sensitivity is responsible for the spread of data in region 34 of FIG. 2.

Increases in traverse speed, in general, lead to reductions in vent depth and make the separation of the glass sheet into two sub-pieces unreliable. A major drawback of existing laser score and snap techniques has been the limited exposure (or residence) time provided by "short" laser beams (i.e. laser beams having a small footprint on the surface of the glass). The exposure time becomes progressively short (e.g., ~100-120 ms for beam lengths shorter than 50-60 mm) when the scoring speed approaches or exceeds 500 mm/s.

As discussed above, in accordance with embodiments of the present invention, an elongated beam having an untruncated length $L_0$ greater than or equal to 200 millimeters is used to perform the separation in a single step. This enables heat transfer deep into the glass without overheating the glass surface at the traverse speeds described herein. The vent depth created by such a beam can then be made to extend completely through the glass thickness. Although there is no theoretical limit on the length of the laser beam used in the practice of the invention, based on cost and other practical considerations, $L_0$ will typically be about 200 mm, although longer beams can be used if desired. If high separation speed is not required, then beam length of about 100 mm can be used.

The laser beam will typically be produced by a $CO_2$ laser, although other types of lasers can be used if desired. To achieve an $L_0$ value of 200 millimeters or longer, the beam will typically be passed through a beam expander and then elongated using cylindrical optics. For purposes of the present invention, the $L_0$ value for an untruncated beam is determined using the $1/e^2$ definition of beam length of the ISO 11146 standard. That is, the boundaries of the laser beam are defined as the locations at which beam intensity has fallen to $1/e^2$ of its peak value $I_{peak}$. According to this definition approximately 86% of the total beam energy is transmitted through the defined boundaries.

Figure 3:
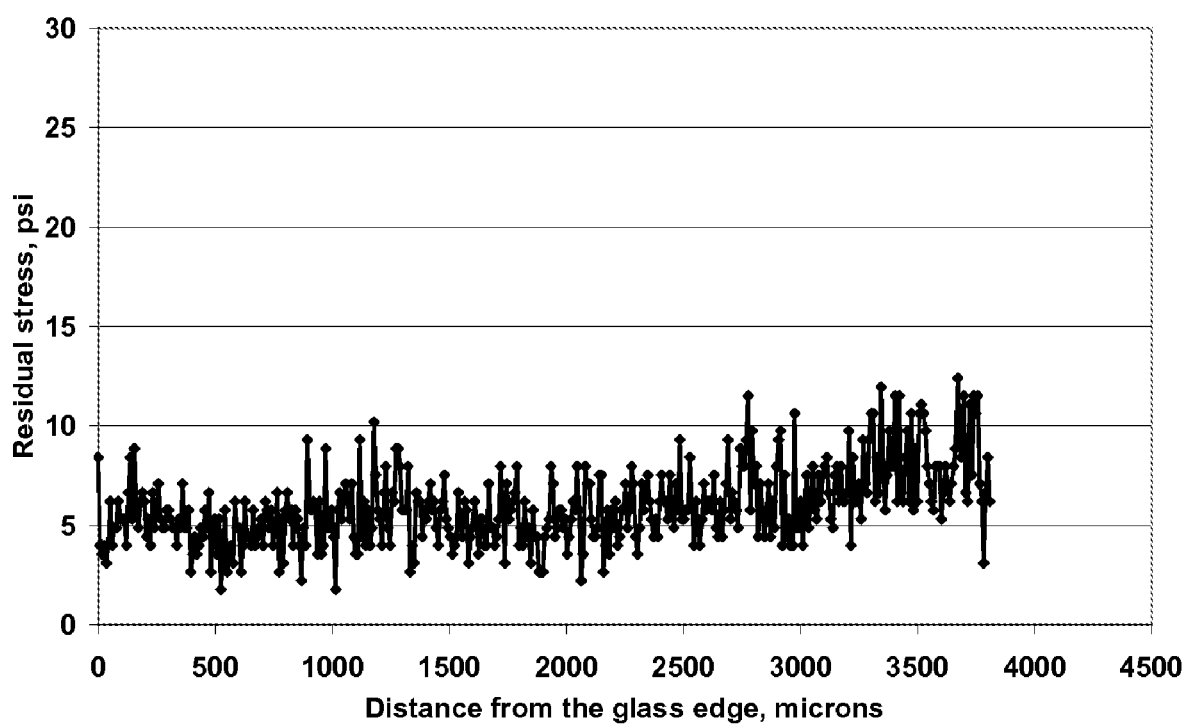
FIG. 3 shows stress plotted against distance from a separated edge of a glass sheet separated according to an embodiment of the present invention.

In one experiment, a sheet of Corning Eagle XG™ glass having a nominal thickness of 0.7 mm was separated in accordance with methods of the present invention, and the stress at the separated edges of the sheet was measured as a function of the distance from the edge. The sheet was separated at a speed of 150 mm/s using a $CO_2$ laser having an untruncated elongated footprint on the sheet of about 200 mm and a power density at the surface of the sheet of about 1.0 W/mm². The data is shown in FIG. 3, and indicates that no residual stress near the glass edge was left after laser separation above the background stress in the glass, which is less than about 15 psi.

Separation of glass sheets performed according to embodiment of the present invention have been shown to produce edge surfaces superior to score and snap edges, with virtually no hackle present, and edge surfaces perpendicular to the major surfaces (e.g. major surface 10) of the sheet within 0.3 degrees of perpendicular.

As discussed above, in accordance with the invention, the maximum temperature $T_{max}$ at the surface of the glass surface during scoring is kept well below the strain point $T_{strain}$ of the glass, i.e., the temperature at which the glass has a viscosity of $10^{13.5}$ Pa·s ($10^{14.5}$ poise). Preferably, $T_{max} \leq T_{strain} - 150$, more preferably, $T_{max} \leq T_{strain} - 200$, and in certain circumstances $T_{max} \leq T_{strain} - 250$, where $T_{max}$ and $T_{strain}$ are in °C. The glass temperature can be measured in various ways, a preferred procedure being through the use of a thermal imaging (thermal vision) camera.

By controlling $T_{max}$ to be substantially below the glass strain point, the amount of residual stress in the glass after separation is reduced. Preferably, the peak residual stress in sub-pieces produced from the glass sheet is less than or equal to 100 psi and most preferably, less than or equal to 50 psi. The peak residual stress in a separated sheet is preferably measured using a birefringence technique.

As will be evident from the foregoing, the invention can be practiced using an untruncated beam but may employ a beam which has been truncated on one end, i.e., its trailing end closest to (proximal to) the coolant area. The truncation can be performed using a shield specifically constructed for this purpose. Alternatively, a portion of the nozzle assembly used to apply coolant to the sheet can be positioned to intercept and thus truncate the trailing part of the beam.

It should be noted that the degree of beam blockage in accordance with the present invention preferably does not exceed approximately 20% of the total beam length. Also, the degree of beam blockage is preferably selected depending on the desired traverse speed. Moreover, when the cooling nozzle assembly is used to perform beam blockage, selection of a desired position of the coolant zone within the beam leads to a different degree of truncation of the beam while at the same time holding constant the distance from the rear edge of the beam to the front edge of the cooled area.

In some embodiments, separation of the glass sheet can be improved by inducing a small tensile stress in the glass sheet at the surface on which the laser beam impinges, such as by bending, during the traverse of the laser beam.

Although specific embodiments of the invention have been described and illustrated, it is to be understood that modifications can be made without departing from the spirit and scope of the invention. For example, although the invention has been discussed and illustrated in terms of the separation of LCD glass having a thickness of 0.7 mm using a $CO_2$ laser operating at 10.6 μm, the invention can be applied to other types of glasses and can use other types of lasers operating at different wavelengths if desired.

A variety of other modifications which do not depart from the scope and spirit of the invention will be evident to persons of ordinary skill in the art from the disclosure herein. The following claims are intended to cover the specific embodiments set forth herein as well as such modifications, variations, and equivalents.

What is claimed is:

1. A method of separating a glass sheet comprising:
   (a) translating a single elongated laser beam having a peak intensity $I_{peak}$ over a surface of the glass sheet at a speed S, said beam being characterized by an untruncated length $L_0$, where $L_0$ equals the maximum distance along the length of the beam between locations at which the beam intensity at the surface of the glass sheet, in the absence of any truncation, has fallen to $1/e^2$ of $I_{peak}$; and
   (b) translating a coolant area over the surface of the glass sheet in tandem with the laser beam, thereby separating the glass sheet into sub-pieces;
   wherein:
   (i) S is less than about 200 millimeters/second;
   (ii) $L_0$ is greater than or equal to 100 millimeters; and
   (iii) $I_{peak}$ and $L_0$ are selected such that translation of the laser beam over the surface of the glass sheet at speed S produces a maximum temperature at the surface of the glass sheet that is at least about 150° C. less than a strain point of the glass; and
   wherein the glass sheet is separated in a single traverse of the laser beam.

2. The method according to claim 1, wherein prior to contacting the surface of the glass sheet, a portion of the beam is truncated, said portion being proximal to the coolant area.

3. The method according to claim 2, wherein the length of the truncated portion of the beam is less than or equal to $0.2*L_0$.

4. The method according to claim 1, wherein a peak residual stress in sub-pieces produced from the glass sheet is less than or equal to 100 psi.

5. The method according to claim 1, wherein a peak residual stress in sub-pieces produced from the glass sheet is less than or equal to 50 psi.

6. The method according to claim 1, wherein a power density of the laser beam at the surface of the glass sheet is less than about 1.5 w/m².

7. The method according to claim 1, wherein a maximum temperature at the surface of the glass sheet is between about 460° C. and 510° C.

8. The method according to claim 1, further comprising bending the glass sheet during the translating of the laser beam.

9. The method according to claim 1, wherein an edge of the sheet is within 0.3 degrees of perpendicular to the surface.

10. The method according to claim 1, wherein the glass sheet has a coefficient of thermal expansion between about $30 \times 10^{-7}$/° C. and $35 \times 10^{-7}$/° C.

* * * * *